United States Patent
Yung et al.

(10) Patent No.: US 11,618,238 B2
(45) Date of Patent: Apr. 4, 2023

(54) NONWOVEN MULTILAYER STRUCTURES HAVING NANOFIBER LAYERS

(71) Applicant: Ascend Performance Materials Operations LLC, Houston, TX (US)

(72) Inventors: Wai-Shing Yung, Pensacola, FL (US); Albert E. Ortega, Pensacola, FL (US); Joseph L. Menner, Pinehurst, TX (US); Vikram Gopal, The Woodlands, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 380 days.

(21) Appl. No.: 16/845,887

(22) Filed: Apr. 10, 2020

(65) Prior Publication Data

US 2020/0324510 A1    Oct. 15, 2020

Related U.S. Application Data

(60) Provisional application No. 62/833,326, filed on Apr. 12, 2019.

(51) Int. Cl.
| | | |
|---|---|---|
| *B32B 5/02* | (2006.01) | |
| *D04H 1/56* | (2006.01) | |
| *B32B 27/28* | (2006.01) | |
| *B32B 37/04* | (2006.01) | |
| *B82Y 30/00* | (2011.01) | |
| *B82Y 40/00* | (2011.01) | |

(52) U.S. Cl.
CPC ............. *B32B 5/022* (2013.01); *D04H 1/565* (2013.01); *B32B 27/28* (2013.01); *B32B 37/04* (2013.01); *B32B 2307/718* (2013.01); *B32B 2307/732* (2013.01); *B82Y 30/00* (2013.01); *B82Y 40/00* (2013.01)

(58) Field of Classification Search
USPC ............... 428/212; 210/637, 137, 490, 650; 442/334; 28/107, 112
See application file for complete search history.

(56) References Cited

U.S. PATENT DOCUMENTS

| | | |
|---|---|---|
| 7,504,348 B1 | 3/2009 | Hagewood et al. |
| 7,740,777 B2 | 6/2010 | Wilkie et al. |
| 7,927,540 B2 | 4/2011 | Smithies et al. |
| 8,241,024 B2 | 8/2012 | Hartge |
| 8,282,712 B2 | 10/2012 | Chi et al. |

(Continued)

FOREIGN PATENT DOCUMENTS

| | | |
|---|---|---|
| EP | 3029191 | 6/2016 |
| GB | 2462192 | 2/2010 |

(Continued)

OTHER PUBLICATIONS

International Application No. PCT/US2020/027760, International Search Report and Written Opinion dated Jun. 19, 2020, 13 pages.

*Primary Examiner* — Lynda Salvatore
(74) *Attorney, Agent, or Firm* — Cozen O'Connor

(57) ABSTRACT

Nonwoven multilayer structures having at least two nanofiber layers are described herein. The nonwoven multilayer structure may have two nanofibers layers that have different properties from each other, such as fiber diameter. One nanofiber layer may be produced by an electrospinning process, while another nanofiber layer may be produced by a melt blown process.

16 Claims, 2 Drawing Sheets

(56) References Cited

U.S. PATENT DOCUMENTS

| | | | |
|---|---|---|---|
| 8,679,218 B2 | 3/2014 | Wertz et al. | |
| 9,177,729 B2 | 11/2015 | Kim et al. | |
| 9,462,390 B2 | 10/2016 | Lee et al. | |
| 9,464,369 B2 | 10/2016 | Isele et al. | |
| 10,155,187 B2 | 12/2018 | Wertz et al. | |
| 2008/0023888 A1 | 1/2008 | Brang et al. | |
| 2008/0284050 A1 | 11/2008 | Mares et al. | |
| 2008/0307766 A1 | 12/2008 | Petras et al. | |
| 2009/0199717 A1 | 8/2009 | Green et al. | |
| 2011/0064928 A1* | 3/2011 | Bonneh | D04H 3/14 428/212 |
| 2012/0318754 A1 | 12/2012 | Cox et al. | |
| 2016/0303498 A1 | 10/2016 | Doucouré et al. | |
| 2017/0304755 A1 | 10/2017 | Bansal et al. | |
| 2018/0298526 A1 | 10/2018 | Wilkie et al. | |

FOREIGN PATENT DOCUMENTS

| | | | |
|---|---|---|---|
| WO | 2006071980 | 7/2006 | |
| WO | 2009136395 | 11/2009 | |
| WO | 2010065949 | 6/2010 | |
| WO | WO2011091251 A2 * | 7/2011 | D01D 4/025 |
| WO | 2018227069 | 12/2018 | |

\* cited by examiner

NONWOVEN MULTILAYER STRUCTURES HAVING NANOFIBER LAYERS

CROSS-REFERENCE TO RELATED APPLICATION

This application claims priority to U.S. Provisional App. No. 62/833,326, filed Apr. 12, 2019, the entire contents and disclosure of which is hereby incorporated by reference.

TECHNICAL FIELD

The present disclosure generally relates to nonwoven multilayer structures comprising at least two nanofiber layers that can be used in a variety of articles and purposes.

BACKGROUND

Nonwoven multilayer structures are known in the art and are used for a variety of articles and purposes. In particular, the need for articles produced from nonwovens containing nanofibers has continued to increase. The fiber diameters of nanofibers are generally understood to be on average less than 1000 nanometers. Electrospinning is a commonly used method of producing nanofibers having very small fiber diameters. However, the production rates for electrospinning are very slow and the nanofibers are typically produced only in small quantities.

Previous attempts to make multilayer structures have involved placing nanofibers on microfibers, e.g. average diameter greater than 1 micron, or on larger diameter scrim layers. While these structures may be useful in some applications, it has been found to be difficult to collect the nanofiber layers on the microfiber or scrim layers. And production rates remain low.

Despite the variety of techniques and materials proposed, conventional multilayer structures have much to be desired in terms of production rates, manufacturing costs, processability, and product properties.

SUMMARY

In some embodiments, the present disclosure is directed to a nonwoven multilayer structure comprising a first nanofiber layer and second nanofiber layer, wherein the nanofibers of the first layer are made by a melt or solvent electrospinning process and the nanofibers of the second layer are made by a melt blown process. Both the first and second nanofiber layers are nonwoven. In one embodiment, the melt or solvent electrospun nanofibers have an average fiber diameter that is less than or equal to 300 nanometers, preferably less than or equal to 150 nanometers. In one embodiment, less than 20% of the electrospun nanofibers have a diameter of greater than 100 nanometers. In one embodiment, the melt blown nanofibers have an average fiber diameter that is from 250 nm to 950 nm. In one embodiment, no more than 20% of the melt blown nanofibers have a diameter of greater than 700 nanometers. The basis weight of the first nonwoven layer may be less than second nonwoven layer. In one embodiment, the basis weight of the first nonwoven layer is less than or equal to 25 gsm. In one embodiment, the basis weight of the second nonwoven layer is from 0.9 to 50 gsm. The first nonwoven layer may comprise a first polymer and the second nonwoven layer may comprise a second polymer. In some embodiment, the first polymer may be different than the second polymer. For purposes of the present disclosure, a first polymer may be different from a second polymer based on its method of production (electrospinning v. melt blown), one of its properties (e.g., average fiber diameter), and/or the type of polymer. The first and/or second polymers may independently comprise polyimide, polyolefin, polyamide, polyester, polystyrene, polyacrylonitrile, polyurethane, polylactic acid, polycaprolactone, polysulfone, fluoropolymer, polyacrylonitrile, polymethyl methacrylate, polystyrene, poly(vinyl chloride), poly(vinyl alcohol), poly(vinyl butylene), poly(vinylidene fluoride), polybutylene terephthalate, cellulose, and copolymers or derivative compounds thereof, or combinations thereof. In one embodiment, the second polymer comprises polyamides and more preferably polyamide 66. In one embodiment, the second polymer has relative viscosity (RV) from 2 to 330. In one embodiment, the second polymer has a weight average molecular weight from 2,000 to 85,000. In one embodiment, the first nonwoven layer is less than or equal to 30 microns in thickness and/or the second nonwoven layer is from 5 to 500 microns in thickness. In one embodiment, the first nonwoven layer has a median pore size from 0.01 to 10 microns and/or the second nonwoven layer has a median pore size greater than 1 micron. The ratio of the median pore size ratio of the first nonwoven layer to the second nonwoven layer may be from 1:1 to 1:100. In one embodiment, the second nonwoven layer comprises a second surface, and wherein a scrim layer is adjacent to the second layer. In one embodiment, the second nonwoven layer has an oxidation degradation index (ODI) of less than 200. In one embodiment, the second nonwoven layer has a thermal degradation index (TDI) of less than 4000.

In some embodiments, the present disclosure is directed to a nonwoven multilayer structure comprising (a) a first nonwoven layer having first nanofibers having at least one of the following first properties: (a1) an average fiber diameter from 1 to 300 nm, preferably from 1 to 150 nm; (a2) a basis weight from 0.0001 to 25 gsm; (a3) a median pore size from 0.01 to 10 microns; or (a4) an average thickness of less than or equal to 30 microns; and (b) a second nonwoven layer having second nanofibers having at least one of the following second properties: (b1) an average fiber diameter from 250 to 950 nm; (b2) a basis weight from 0.9 to 50 gsm; (b3) a median pore size greater than 1 micron; (b4) an average thickness from 5 to 500 microns; (b5) less than 1 wt. % solvent; (b6) thermal degradation index of less than 4000; or (b7) oxidative degradation index of less than 200; wherein the first property is different from the second property. In a further embodiment, the first nonwoven layer has two or more of the properties (a1) to (a4) and the second nonwoven layer has two or more of the properties (b1) to (b7). In yet another embodiment, the first nonwoven layer having first nanofibers having at least three of the properties (a1) to (a4) and the second nonwoven layer having second nanofibers having at least three of the properties (b1) to (b7). In one embodiment, first nonwoven layer comprises a first polymer and the second nonwoven layer comprises a second polymer. In some embodiment, the first polymer may be different than the second polymer. The first and/or second polymers may independently comprise polyimide, polyolefin, polyamide, polyester, polystyrene, polyacrylonitrile, polyurethane, polylactic acid, polycaprolactone, polysulfone, fluoropolymer, polyacrylonitrile, polymethyl methacrylate, polystyrene, poly(vinyl chloride), poly(vinyl alcohol), poly (vinyl butylene), poly(vinylidene fluoride), polybutylene terephthalate, cellulose, and copolymers or derivative compounds thereof, or combinations thereof. In one embodiment, the second polymer has relative viscosity (RV) from 2 to 330. In one embodiment, the second polymer has a weight average molecular weight from 2,000 to 85,000.

In some embodiments, the present disclosure is directed to a nonwoven multilayer structure comprising (a) a first nonwoven layer having first nanofibers, preferably prepared by an electrospinning process, having (a1) an average fiber diameter from 1 to 300 nm, preferably from 1 to 150 nm; (a2) a basis weight from 0.0001 to 25 gsm; (a3) a median pore size from 0.01 to 10 microns; and (a4) an average thickness of less than or equal to 30 microns; and (b) a second nonwoven layer having second nanofibers, preferably prepared by an melt blown process, having (b1) an average fiber diameter from 250 to 950 nm; (b2) a basis weight from 0.9 to 50 gsm; (b3) a median pore size greater than 1 micron; and (b4) an average thickness from 5 to 500 microns. In further embodiments, the second nonwoven layer comprises a polymer composition having (b5) less than 1 wt. % solvent and the second nonwoven layer (b6) thermal degradation index of less than 4000; and (b7) oxidative degradation index of less than 200.

In some embodiments, the present disclosure is directed to a nonwoven multilayer structure comprising a first nonwoven layer having a nanofiber; and a second nonwoven layer comprising melt blown nanofibers of a second polymer and having a first surface, wherein the second polymer is a polyamide, such as but not limited to polyamide 66, and wherein the first layer is adjacent to at least the first surface. In some embodiments, the first nonwoven layer may also be a polyamide.

In some embodiments, the present disclosure is directed to a nonwoven multilayer structure comprising a first nonwoven layer comprising first fibers having median pore size from 0.01 to 10 microns; and a second nonwoven layer comprising second fibers, and having a first surface, wherein the fibers have an average fiber diameter that is from 250 nm to 950 nm, wherein the first layer is adjacent to at least the first surface. The first and/or second polymers may independently comprise polyimide, polyolefin, polyamide, polyester, polystyrene, polyacrylonitrile, polyurethane, polylactic acid, polycaprolactone, polysulfone, fluoropolymer, polyacrylonitrile, polymethyl methacrylate, polystyrene, poly (vinyl chloride), poly(vinyl alcohol), poly(vinyl butylene), poly(vinylidene fluoride), polybutylene terephthalate, cellulose, and copolymers or derivative compounds thereof, or combinations thereof. In one embodiment, the second polymer has relative viscosity (RV) from 2 to 330. In one embodiment, the second polymer has a weight average molecular weight from 2,000 to 85,000.

In some embodiments, the present disclosure is directed to a nonwoven multilayer structure comprising a first nonwoven layer comprising first fibers having a basis weight of less than or equal to 25 gsm; and a second nonwoven layer comprising second fibers, and having a first surface, wherein the fibers have an average fiber diameter that is from 250 nm to 950 nm, wherein the first layer is adjacent to at least the first surface. The first and/or second polymers may independently comprise polyimide, polyolefin, polyamide, polyester, polystyrene, polyacrylonitrile, polyurethane, polylactic acid, polycaprolactone, polysulfone, fluoropolymer, polyacrylonitrile, polymethyl methacrylate, polystyrene, poly (vinyl chloride), poly(vinyl alcohol), poly(vinyl butylene), poly(vinylidene fluoride), polybutylene terephthalate, cellulose, and copolymers or derivative compounds thereof, or combinations thereof. In one embodiment, the second polymer has relative viscosity (RV) from 2 to 330. In one embodiment, the second polymer has a weight average molecular weight from 2,000 to 85,000.

In some embodiments, the present disclosure is directed to a nonwoven multilayer structure comprising a first nonwoven layer comprising fibers of a first polymer, wherein the fibers have an average fiber diameter that is less than or equal to 300 nanometers, e.g., less than or equal to 150 nanometers; and a second nonwoven layer comprising fibers of a second polymer, and having a first surface, wherein the fibers have an average fiber diameter that is from 250 nm to 950 nm, wherein the first layer is adjacent to at least the first surface. The first and/or second polymers may independently comprise polyimide, polyolefin, polyamide, polyester, polystyrene, polyacrylonitrile, polyurethane, polylactic acid, polycaprolactone, polysulfone, fluoropolymer, polyacrylonitrile, polymethyl methacrylate, polystyrene, poly (vinyl chloride), poly(vinyl alcohol), poly(vinyl butylene), poly(vinylidene fluoride), polybutylene terephthalate, cellulose, and copolymers or derivative compounds thereof, or combinations thereof. In one embodiment, the second polymer has relative viscosity (RV) from 2 to 330. In one embodiment, the second polymer has a weight average molecular weight from 2,000 to 85,000.

In some embodiments, the present disclosure is directed to a process for producing a nonwoven multilayer structure, comprising melt blowing a polymer having a relative viscosity (RV) from 2 to 330 to form a nonwoven layer comprising nanofibers; and electrospinning a polymer solution or polymer melt onto the nonwoven layer.

BRIEF DESCRIPTION OF DRAWINGS

The disclosure is described in detail below with reference to the drawings wherein like numerals designate similar parts and wherein.

In the appended FIGS., similar components and/or features may have the same numerical reference label. Various components of the same type may be distinguished by following the reference label by a letter that distinguishes among the similar components and/or features. If only the first numerical label is used in the specification, the description is applicable to any one of the similar components and/or features having the same first numerical reference label irrespective of the letter suffix.

DETAILED DESCRIPTION

The present disclosure is directed, in part, to nonwoven multilayer structures having at least one nanofiber layer, e.g., at least two nanofiber layers, with the layers being made via different production methods and/or having different properties or characteristics. This may allow each layer to be made of the same type of polymer, although each layer may also be made of different types of polymer. In some embodiments, the nanofiber layers are adjacent to each other. In some embodiments, nanofibers are useful to provide a barrier layer with good air permeability for a relatively low basis weight of the structure.

As used herein, when a layer is referred to as being "adjacent" another layer, it is understood that there are no intervening layers, such as adhesives, spacers or sacrificial layers, between the two adjacent layers. The nanofibers between adjacent layers may intermingle or entangle along the surface with each other. Also, when a layer is referred to as being "adjacent" another layer, it is understood that only a portion of the layers may be adjacent—the entire layer need not be adjacent.

1. Nonwoven Multilayer Structures

Figure 1:
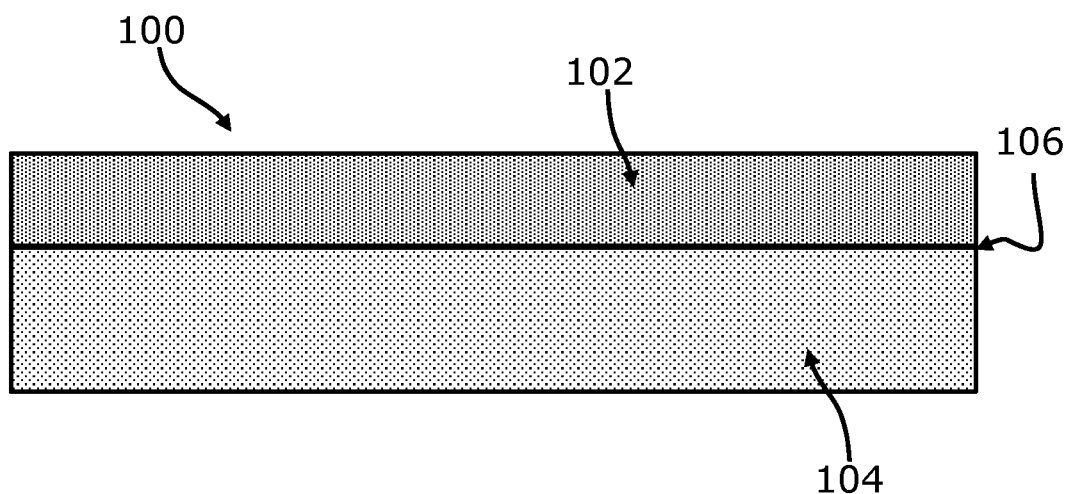
FIG. 1 is a nonwoven multilayer structure comprising a first nanofiber layer and second nanofiber layer according to various embodiments.

FIG. 1 shows a cross-sectional nonwoven multilayer structure 100 having a first layer 102 adjacent to a second layer 104. As shown in FIG. 1, first layer 102 is on the surface 106 of second layer 104. As described herein first layer 102 and second layer 104 are separate and different by at least one property. As shown in FIG. 1, first layer 102 is an electrospun nanofiber and second layer 104 is a melt blown nanofiber layer having at least one property different than the first layer.

As shown in FIG. 1, no separate adhesive layer is needed to join the first layer 102 to the second layer 104. Thus, in some embodiments, the structure does not comprise an adhesive layer. The elimination of the adhesive layer beneficially provides for production and cost efficiencies.

Figure 2:
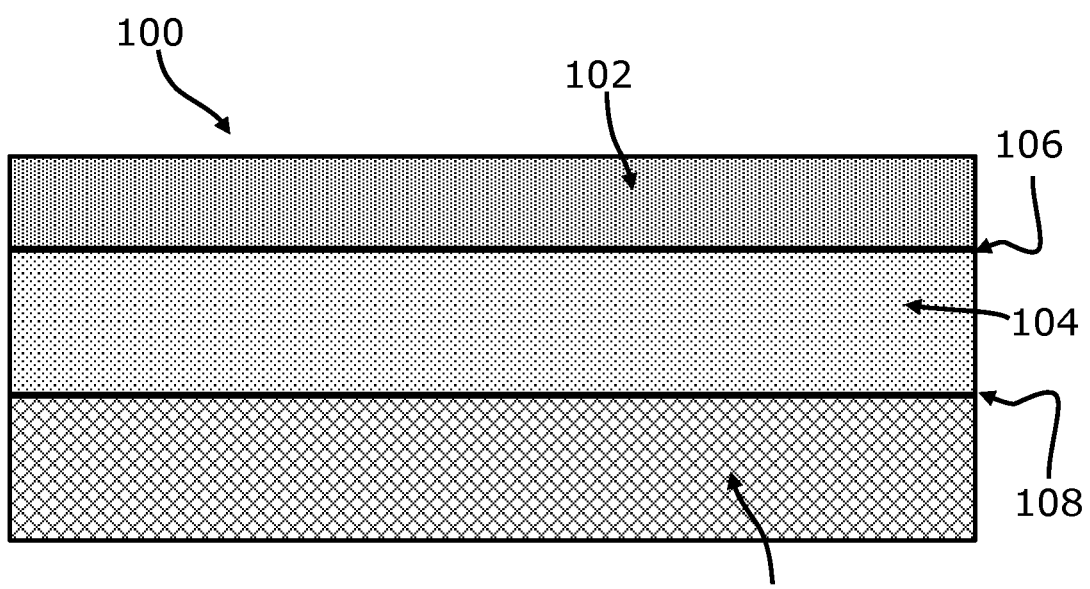
FIG. 2 is a nonwoven multilayer structure comprising a first nanofiber layer and second nanofiber layer, wherein the second nanofiber layer is adjacent to a scrim layer according to various embodiments.

FIG. 2 shows an exemplary filter media comprising a nonwoven multilayer structure 100 on a scrim layer 110. As shown in FIG. 2, the surface 108 of the second layer 104 opposite to the first layer 102 is disposed on the scrim layer 110. In some embodiments, the second layer 104 may be adjacent to the scrim layer 110. In one embodiment, second layer 104 may be melt blown onto the scrim layer 110, such that no adhesives are necessary. In other embodiments, the second layer 104 may be joined to the scrim layer 110 by an adhesive layer, lamination, calendering, or other suitable means.

Figure 3:
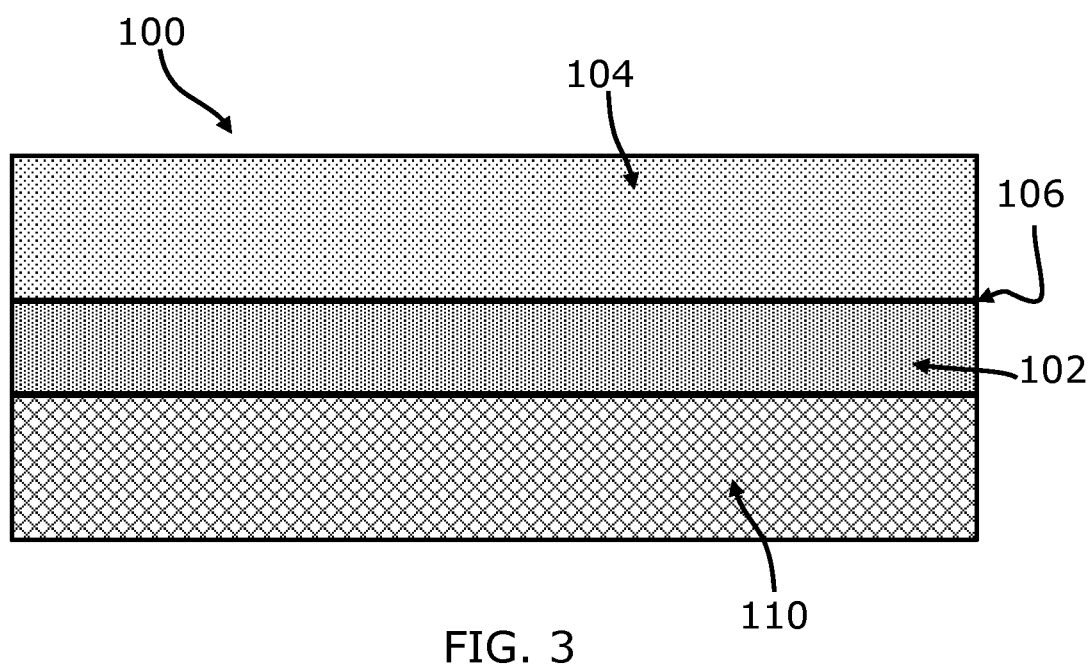
FIG. 3 is a nonwoven multilayer structure comprising a first nanofiber layer and second nanofiber layer, wherein the first nanofiber layer is adjacent to a scrim layer according to various embodiments.

FIG. 3 shows another exemplary filter media comprising a nonwoven multilayer structure 100 on a scrim layer 110, with the first layer 102 adjacent to the scrim layer 110. In one embodiment, first layer 102 may be adjacent to the scrim layer 110, such that no adhesives are necessary. In other embodiments, the first layer 102 may be joined to the scrim layer 110 by an adhesive layer, lamination, calendering, or other suitable means.

In further embodiments, there may be a scrim layer on both the first layer 102 and second layer 104.

The scrim layer 110 in FIGS. 2 and 3 is a substrate layer that may be used in filtration. Generally scrim layers are used to provide structural support to the nonwoven layers. Depending on the use, the scrim may be positioned upstream or downstream of the air/liquid to be treated. The nonwoven multilayer structures described herein may be applied to other substrate layers depending on the various applications. In some embodiments, the multilayer structure may also be adjacent to a textile layer, such as a knitted, woven or nonwoven fabric.

Various scrim layers may be used. In some embodiments, the scrim layer may have a basis weight that is less than or equal to 400 grams per square meter (gsm), e.g., less than or equal to 375 gsm, less than or equal to 350 gsm, less than or equal to 325 gsm, less than or equal to 300 gsm, less than or equal to 275 gsm, less than or equal to 250 gsm, less than or equal to 225 gsm, less than or equal to 200 gsm, less than or equal to 100 gsm, or less than or equal to 50 gsm. In some embodiments, the scrim layer may have a basis weight that is greater than or equal to 7 gsm, e.g., greater than or equal to 10 gsm, greater than or equal to 25 gsm, greater than or equal to 50 gsm, greater than or equal to 75 gsm, greater than or equal to 100 gsm, greater than or equal to 150 gsm or greater than or equal to 200 gsm. Thus, suitable ranges for the scrim layer may include from 10 to 400 gsm, e.g., from 10 to 200 gsm, or from 20 to 100 gsm, as well as other subranges therein. In one embodiment, scrims having a basis weight of less than or equal to 20 gsm are used.

It should be understood that the configurations of the nonwoven multilayer structures and filter media in the FIGS. are merely exemplary, and other configurations are within the scope of the disclosure. It should be appreciated that the terms "first", and "second" layer, as used herein, refer to different layers within the nonwoven multilayer structures, and are not meant to be limiting with respect to the location or the order of production. For example, while the first and second layers are shown in a specific order in FIG. 1, other configurations are also possible. For example, the second layer may be produced first, by a melt blown process, and the first layer may be formed on the second layer, by an electrospinning process.

2. First Layer

The first layer is a nonwoven nanofiber layer. The physical characteristics of the first nanofiber layer may be balanced to produce a nanofiber layer that imparts beneficial properties to the nonwoven multilayer structure. These physical characteristics include the type of polymer used for the nanofiber as well as the production method. In addition, other physical characteristics may include, for example, average fiber diameter, median pore size, basis weight, density, surface area, and thickness.

In some embodiments, the polymer for the first nanofiber layer includes polyimide, polyolefin, polyamide, polyester, polystyrene, polyacrylonitrile, polyurethane, polylactic acid, polycaprolactone, polysulfone, fluoropolymer, polyacrylonitrile, polymethyl methacrylate, polystyrene, poly(vinyl chloride), poly(vinyl alcohol), poly(vinyl butylene), poly(vinylidene fluoride), polybutylene terephthalate, cellulose, and copolymers or derivative compounds thereof, and combinations thereof. Suitable polyolefins include polyethylene and polypropylene. Suitable polysulfones includes polyether sulfone, polyaryl ether sulfone, modified polysulfone polymers, modified polyethersulfone polymers. Suitable polyamides include aliphatic and aromatic polyamides, and further includes polyamides such as N46, N26, N4, N36, N44, N6, N66, N6T/66, N612, N6/66, N6I/66, N66/6I/6T, N11, and/or N12, wherein "N" means Nylon or polyamide, "T" refers to terephthalic acid and "I" refers to isophthalic. Suitable fluoropolymers include poly(vinylidene fluoride), polytetrafluoroethylene (PTFE), and expanded PTFE. Suitable polyesters include poly(ethylene terephthalate) and polybutylene terephthalate. In some embodiments, the polymer for the first nanofiber layer may be the same type of polymer used for the second nanofiber layer, e.g., both polyamide, even though the process for producing each layer is different.

In some embodiments, the first layer may be produced by a suitable method that results in the desired properties for the nanofibers. Examples include electrospinning (including melt electrospinning or solvent electrospinning) or electro blowing. Morphology of the electrospun nanofibers may be controlled by various parameters, such as the solution, voltage applied, pump rate, temperature, humidity, etc.

In some embodiments, the first layer may comprise a high percentage of nanofibers produced by electrospinning, e.g., greater than or equal to 90%, greater than or equal to 93%, greater than or equal to 95%, greater than or equal to 97%, greater than or equal to 98%, greater than or equal to 99%, or greater than or equal to 99.5%. In terms of ranges, the percentage of nanofibers produced by electrospinning is from 90% to 100%, e.g., from 93 to 100% or from 95% 100%, including any subranges therein.

As described herein, in some embodiments, the first layer may be produced directly upon the second layer. This can be accomplished by the production of nanofibers from polymeric solution through electrospinning via an electric field created by a voltage differential between a collecting and spinning electrode. The polymeric solution may comprise from 10 to 90% polymer and from 10 to 90 wt. % solvent (formic and/or acetic acid). During this process, the solvent is evaporated off the nanofibers which draws down the fiber diameter during their flight. Typically, the electrospinning processes uses a collection media, such as a paper backer or aluminum foil. The electrospun nanofiber must be removed from the collection media and then attached to the scrim or other suitable support layer. When removed from the collection media a portion of the nanofiber layer may be damaged leading to limitations in applications. It is difficult to collect the electrospun nanofiber on scrims or microfiber layers because the scrims are too permeable to adequately collect nanofibers. The quality of the final media with an electrospun layer is limited by the quality or uniformity of the scrim or microfiber layer upon which the electrospun nanofibers are deposited. A more uniform scrim or microfiber layer would be advantageous. Also, a scrim or microfiber with smaller pores, i.e., a lower mean flow pore diameter would be an improvement. Advantageously, the various embodiments of the present disclosure may improve process efficiency by eliminating the need for a removable collection media. Instead, the disclosed structures use the second layer as the collection media, not a separate collection media.

In some embodiments, the first nanofiber layer may have an average fiber diameter of less than or equal to 300 nm, e.g., less than or equal to 250 nm, less than or equal to 225 nm, less than or equal to 200 nm, less than or equal to 175 nm, less than or equal to 150 nm, less than or equal to 125 nm, less than or equal to 100 nm, less than or equal to 90 nm, less than or equal to 80 nm, or less than or equal to 75 nm. The minimum average fiber diameter may be greater than or equal to 1 nm, e.g., greater than or equal to 5 nm, greater than or equal to 10 nm, greater than or equal to 15 nm, greater than or equal to 20 nm, or greater than or equal to 25 nm. It is understood that various ranges from these average fiber diameters are within the scope of the present disclosure. This includes, but is not limited to, ranges from 1 to 300 nm, e.g., from 1 to 250 nm, from 5 to 250 nm, from 5 to 200 nm, or from 5 to 100 nm.

In some embodiments, the distribution of the nanofibers in the first layer is relatively narrower, within 50 nm, e.g., within 40 nm or within 35 nm. In the first layer, less than 20% of the nanofibers may have a fiber diameter from greater than 100 nm, e.g., less than 15%, less than 12%, less than 10%, less than 5%, or less than 3%. In terms of lower limits, at least 0.5% of the nanofibers in the first layer have a fiber diameter of greater than 100 nm, e.g., at least 1%, at least 1.25%, at least 1.5%, or at least 1.75%. In terms of ranges, from 0.5 to 20% of the nanofibers in the first layer have a fiber diameter of greater than 100 nanometers, e.g., from 0.5 to 15%, from 0.5 to 12%, from 0.5 to 10%, or from 0.5 to 5%. In some cases, the average fiber diameter of the first nanofiber layer is generally smaller than that of the second nanofiber layer, e.g., at least 5% smaller, at least 10% smaller, at least 20% smaller, at least 25% smaller, at least 50% smaller, or at least 75% smaller.

In other embodiments, the first nanofiber layer, preferably for polyurethane polymers, may have an average fiber diameter of not less 300 nm. This includes, but is not limited to, ranges from 300 to 1000 nm, e.g., from 300 to 950 nm, from 400 to 900 nm, from 450 to 800 nm, or from 500 to 750 nm.

To the extent not indicated otherwise, test methods for determining average fiber diameters, are as indicated in Hassan et al., J of Membrane Sci., 427, 336-344, 2013, unless otherwise specified. Diameter is recognized as referring to the greatest cross-sectional dimension of the fiber.

In some embodiments, the first nanofiber layer may have a relatively low basis weight as compared with the second layer. Using the electrospinning process it becomes slower and more expensive to increase the basis weight. The first nanofiber layer may have a basis weight of less than or equal to 25 gsm, e.g., less than or equal to 20 gsm, less than or equal to 15 gsm, less than or equal to 10 gsm, less than or equal to 5 gsm, less than or equal to 1 gsm, less than or equal to 0.5 gsm, or less than or equal to 0.1 gsm. In terms of a lower limit, the basis weight of the first nanofiber layer is greater than or equal to 0.0001 gsm, e.g., greater than or equal to 0.001 gsm, greater than or equal to 0.1 gsm, greater than or equal to 0.5 gsm, greater than or equal to 1 gsm, or greater than or equal to 1.5 gsm. It is understood that various ranges from these values are within the scope of the present disclosure. For example, the basis weight of the first nanofiber layer may be from 0.0001 to 25 gsm, or any subrange within this range, such as from 0.0001 to 10 gsm. Basis weight may be determined by ASTM D-3776.

The pore size of electrospun first nanofiber layer may vary depending on the type of the polymer. Pore size generally increases with increases in fiber diameter. The pore size of the first nanofiber layer provides the composite with its properties and thus depending on the application (filtration or water barrier), the pore size may vary. The pore size for the first nanofiber layer may depend on the application. In one exemplary embodiment, the median pore size of the first nanofiber layer may be less than or equal to 10 microns, e.g., less than or equal to 5 microns, less than or equal to 3 microns, less than or equal to 2 microns, or less than or equal to 1 micron. In terms of a lower limit, the median pore size of the first nanofiber layer is greater than or equal to 0.01 microns, e.g., greater than or equal to 0.05 microns, greater than or equal to 0.1 microns, greater than or equal to 0.5 microns, greater than or equal to 1 micron, greater than or equal to 2 microns or greater than or equal to 3 microns. Accordingly, the median pore size may have a range from 0.01 microns to 10 microns, or any subrange within these values, such as from 0.1 to 3 microns. In some embodiments, the median pore size of the first nanofiber layer may be smaller than the second nanofiber layer.

Increasing or slowing the advance rate of the collecting media in the electrospinning process can deposit more or less fibers, thereby allowing control of the thickness of the first nanofiber layer. In some embodiments, the first nanofiber layer is relatively thinner than the second nanofiber layer and may function as a coating. The thickness of the first nanofiber layer is relatively uniform across the length and width and general the thickness variation is smaller than 5%, e.g., smaller than 4%, smaller than 3%, smaller than 2%, smaller than 1%, or smaller than 0.5%. In one embodiment, the thickness of the first nanofiber layer is less than or equal to 30 microns, e.g., less than or equal to 25 microns, less than or equal to 20 microns, less than or equal to 15 microns, less than or equal to 10 microns, less than or equal to 5 microns, or less than or equal to 1 micron. In terms of lower limit, the thickness of the first layer is sufficient to be a separate layer than the second layer, and may be greater than or equal 0.01 microns, e.g., greater than or equal 0.05 microns, greater than or equal 0.1 microns, greater than or equal 0.5 microns, or greater than or equal 1 micron. Accordingly, the thickness may have a range from 0.01 microns to 30 microns, or any subrange within these values.

In some embodiments, the surface area of the first nanofiber layer may be less than or equal to 350 $m^2/g$, e.g., less than or equal to 300 $m^2/g$, less than or equal to 250 $m^2/g$, less than or equal to 250 $m^2/g$, less than or equal to 200 $m^2/g$, less than or equal to 150 $m^2/g$, or less than or equal to 100 $m^2/g$. The lower limit of the surface area of the first nanofiber layer may be greater than or equal to 1 $m^2/g$, e.g., greater than or equal to 5 $m^2/g$, greater than or equal to 10 $m^2/g$, greater than or equal to 25 $m^2/g$, greater than or equal to 50 $m^2/g$, or greater than or equal to 100 $m^2/g$. The ranges of surface area for the first nanofiber layer may be from 1 $m^2/g$ to 350 $m^2/g$. As determined herein, surface area is measured through use of a standard BET surface area measurement technique.

3. Second Layer

Turning now to the second layer, the second layer is also a nonwoven nanofiber layer. In some embodiments, at least one of the properties of the second layer is different from the first layer, and more preferably at least two of the properties are different. As discussed herein, the second nanofiber layer is configured to impart the beneficial properties of the first nanofiber layer to the nonwoven multilayer structure, while having relatively minimal or no adverse effects on the physical properties of the first nanofiber layer.

In particular, the second layer is a melt blown nonwoven nanofiber layer. The second nanofiber layer may be produced by: (a) providing a (spinnable) polyamide composition, wherein the polymer composition, e.g., polyamide composition, has the RV discussed herein; (b) spinning the polymer composition into a plurality of nanofibers having an average fiber diameter of less than 950 nm, e.g., by way of a process directed to 2-phase propellant-gas spinning, including extruding the polymer composition in liquid form with pressurized gas through a fiber-forming channel, and (c) forming the nanofibers into the second nanofiber layer. Melt blowing is advantageously less expensive than electrospinning, and advantageously allows increased production rates. In one embodiment, the use of the melt blown process provides for significant benefits in production rate, e.g., at least 5% greater as compared with electrospinning, at least 10% greater, at least 20% greater, at least 30% greater, at least 40% greater.

In some embodiments, the average fiber diameter of the nanofibers in the second layer may be less than or equal to 950 nm, e.g., less than or equal to 925 nm, less than or equal to 900 nm, less than or equal to 800 nm, less than or equal to 700 nm, less than or equal to 600 nm, or less than or equal to 500 nm. In terms of lower limits, the average fiber diameter of the nanofibers in the second layer may have an average fiber diameter of at least 250 nm, e.g., at least 275 nm, at least 300 nm, at least 325 nm, at least 350 nm, at least 375 nm, or at least 400 nm. In terms of ranges, the average fiber diameter of the nanofibers in the second layer may be from 250 to 950 nm, e.g., from 250 to 925 nm, from 250 to 900 nm, from 250 to 800 nm, from 250 to 700 nm, from 250 to 600 nm, or from 250 to 500 nm.

As discussed above, the first layer is formed from electrospun nanofibers and generally has an average fiber diameter ranging ranges from 1 to 300 nm, e.g., from 1 to 150 nm. Without being bound by theory, it is believed that such small nanofiber diameters for the first layer may result in reduced strength of the fibers and increased difficulty in handling the nanofibers. To improve the handling the first layer is adjacent to the second layer, and may be formed directly thereon. The difference in average fiber diameter between the first layer and second layer is greater than 100 nm, e.g., greater than 110 nm, greater than 125 nm, greater than 150 nm, or greater than 175 nm. The difference in average fiber diameter between the first layer and second layer is less than 950 nm, e.g., less than 900 nm, less than 800 nm, less than 700 nm, less than 600 nm, less than 500 nm, less than 400 nm, less than 300 nm, or less than 200 nm.

For the second layer, less than 20% of the nanofibers may have a fiber diameter from greater than 700 nanometers, e.g., less than 17.5%, less than 15%, less than 12.5%, or less than 10%. In terms of lower limits, at least 1% of the nanofibers have a fiber diameter of greater than 700 nanometers, e.g., at least 2%, at least 3%, at least 4%, or at least 5%. In terms of ranges, from 1 to 20% of the nanofibers in the second layer have a fiber diameter of greater than 700 nanometers, e.g., from 2 to 17.5%, from 3 to 15%, from 4 to 12.5%, or from 5 to 10%. Such a relatively wide distribution differentiates the nanofiber in the second layer from the nanofibers in the first layer formed by electrospinning, which have a smaller average diameter and a much narrower distribution.

Thus, in one embodiment, there is provided a nonwoven multilayer structure comprising a first nonwoven layer comprising first nanofibers, and a second nonwoven layer comprising nanofibers, wherein the distribution of nanofibers in the first nonwoven layer is narrower than the distribution of nanofibers in the second nonwoven layer.

In some embodiments, the second nanofiber layer may have a basis weight of less than or equal to 50 grams per square meter (gsm), e.g., less than or equal to 45 gsm, less than or equal to 40 gsm, less than or equal to 35 gsm, less than or equal to 30 gsm, less than or equal to 25 gsm, less than or equal to 20 gsm, or less than or equal to 15 gsm. In terms of a lower limit, the basis weight of the second nanofiber layer is greater than or equal to 0.9 gsm, e.g., greater than or equal to 1 gsm, greater than or equal to 1.5 gsm, greater than or equal to 2 gsm, greater than or equal to 2.5 gsm, or greater than or equal to 3 gsm. It is understood that various ranges from these values are within the scope of the present disclosure. For example, the basis weight of the second nanofiber layer may be from 0.9 to 50 gsm, or any subrange within this range. Basis weight may be determined by ASTM D-3776. Low cross web basis weight variability will provide a uniform substrate for the electrospun nanofibers to deposit on. In specific embodiments, a second nanofiber layer with cross web uniformity with a % coefficient of variation (% CV) in basis weight of 50% or less is preferred. Cross web uniformity is measured by cutting two inch square samples across the web and weighing them. Samples should be selected from about one to three inches from each edge of the fabric. The two inch squares are weighed and the average and standard deviation of the weights are then determined. % CV is then calculated from these two statistics. In some embodiments, the second nanofiber layer may have a % CV in basis weight of less than or equal to 50%, e.g., less than or equal to 40%, less than or equal to 30%, less than or equal to 20%, less than or equal to 10%, less than or equal to 5%. It is understood that various ranges from these values are within the scope of the present disclosure.

As discussed above, the median pore size of the second nanofiber layer may be larger than the first nanofiber layer so as not to impart the physical characteristics of the first nanofiber layer. In one exemplary embodiment, the median pore size of the second nanofiber layer may be less than or equal to 200 microns, e.g., less than or equal to 175 microns, less than or equal to 150 microns, less than or equal to 125 microns, or less than or equal to 100 microns. In terms of a lower limit, the median pore size of the second nanofiber layer is greater than or equal to 1 micron, e.g., greater than or equal to 1.2 microns, greater than or equal to 1.5 microns, greater than or equal to 2 microns, greater than or equal to 2.5 microns, greater than or equal to 3 microns or greater than or equal to 5 microns. Accordingly, the median pore for the second nanofiber layer may have a range from 1 micron to 200 microns, or any subrange within these values.

The pore size ratio of the first layer to the second layer may be from 1:1 to 1:100, e.g., from 1:5 to 1:100, 1:10 to 1:100 or from 1:15 to 1:100.

In some embodiments, the thickness of the second nanofiber layer is less than or equal to 500 microns, e.g., less than or equal to 400 microns, less than or equal to 300 microns, less than or equal to 250 microns, less than or equal to 200 microns, less than or equal to 150 microns, or less than or equal to 100 microns. In terms of lower limit, the thickness of the first layer is sufficient to be a separate layer than the second layer, and may be greater than or equal 5 microns, e.g., greater than or equal 20 microns, greater than or equal 25 microns, greater than or equal 30 microns, greater than or equal 35 microns, or greater than or equal 50 microns. Accordingly, the thickness may have a range from 5 microns to 500 microns, or any subrange within these values, such as but not limited to 35 micros to 500 microns.

The thickness of the second layer are non-calendered thickness and the second layer may be made thinner by calendering. In some embodiments, the second layer is calendered independent of the first layer and in other embodiments, after the first layer is adjacent to the second layer, both layer may be calendered together.

Unlike electrospinning for the first layer, the melt blown process for the second layer can be conducted in the absence of solvents, such as formic acid, sulfuric acid, toluene, benzene, chlorobenzene, xylene/chlorohexanone, decalin, paraffin oil, ortho dichlorobenzene, and other known solvents. Using no solvents reduces environmental concerns with disposal and handling during preparation. Such solvents are used in solution spinning and the solution spinning process therefore requires additional capital investment to dispose of the solvents. Additional costs may be incurred due to the need for a separate solvent room and a scrubber area. There are also health risks associated with some solvents. Accordingly, the nanofiber nonwoven product may be free of residual solvents, e.g., as are necessarily present in solution spun products. For example, residual solvent from 2.2 to 5 wt. % may be found in solution electrospun processes, as disclosed by L. M. Guerrini, M. C. Branciforti, T Canova, and R. E. S. Bretas, Materials Research, Vol. 12, No. 2, pp 181-190 (2009). Also, some polymers that are extremely difficult to dissolve or do not lend themselves to be electrospun can be easily processed into nanofibers using the meltblowing process.

In some embodiments, the nanofibers of the second layer comprise less than 1 wt. % solvent, less than 5000 ppm, less than 2500 ppm, less than 2000 ppm, less than 1500 ppm, less than 1000 ppm, less than 500 ppm, less than 400 ppm, less than 300 ppm, less than 200 ppm, less than 100 ppm, or less than a detectable amount of solvent. In some aspects, non-volatile solvents, such as formic acid, may remain in the second nanofiber layer after melt blowing and may require an additional extraction step to remove if needed.

Thus, in one embodiment, there is provided a nonwoven multilayer structure comprising a first nonwoven layer comprising first nanofibers, and a second nonwoven layer comprising nanofibers, wherein the second nonwoven layer has a lower concentration of solvents than the first nonwoven layer. Advantageously, the reduction in overall solvent concentration of the structure leads to a more environmentally-friendly process and product.

Accordingly, in some embodiments, the mass ratio of solvents in the second layer is lower than the first layer. For example, the mass ratio of solvents in the second layer to the first layer may be less than or equal to 1:20, e.g., less than or equal to 1:25, less than or equal to 1:30, less than or equal to 1:40, or less than or equal to 1:50. In particular, the mass ratio of formic acid in the second layer to the first layer may be less than or equal to 1:20, e.g., less than or equal to 1:25, less than or equal to 1:30, less than or equal to 1:40, or less than or equal to 1:50.

In one embodiment, to achieve an average fiber diameter of less than 950 nm, the melt blown process may use a polymer having a relative viscosity (RV) from 2 to 330, e.g., from 2 to 300, from 2 to 275, from 2 to 250, from 2 to 225, from 2 to 200, 2 to 100, from 2 to 60, from 2 to 50, from 2 to 40, from 10 to 40, or from 15 to 40.

In another embodiment, the melt blown process may use a polymer having a weight average molecular weight from 2,000 to 85,000, e.g., from 3,000 to 80,000 or from 4,000 to 75,000.

In some embodiments, the second polymer may have both a relative viscosity (RV) from 2 to 330 and weight average molecular weight from 2,000 to 85,000.

Similar to the polymers for the first layer, the polymer for the second nanofiber layer may include polyamide, polyolefin, polyester, polystyrene, polyacrylonitrile, polyurethane, polyimide, polylactic acid, polycaprolactone, polysulfone, fluoropolymer, polyacrylonitrile, polymethyl methacrylate, polystyrene, poly(vinyl chloride), poly(vinyl alcohol), poly(vinyl butylene), poly(vinylidene fluoride), polybutylene terephthalate, cellulose, and copolymers or derivative compounds thereof, and combinations thereof. Suitable polyolefins include polyethylene and polypropylene. Suitable polysulfones includes polyether sulfone, polyaryl ether sulfone, modified polysulfone polymers, modified polyethersulfone polymers. Suitable fluoropolymers include poly(vinylidene fluoride) and polytetrafluoroethylene. Suitable polyesters include poly(ethylene terephthalate) and polybutylene terephthalate.

Suitable polyamides include aliphatic and aromatic polyamides, and further includes polyamides such as N46, N26, N4, N36, N44, N6, N66, N6T/66, N612, N6/66, N6I/66, N66/6I/6T, N11, and/or N12, wherein "N" means Nylon or polyamide, "T" refers to terephthalic acid and "I" refers to isophthalic. Polyamides made by a melt blown process are particularly preferred for the second nanofiber layer in various embodiments disclosed herein. Particularly preferred polyamides include nylon 66, as well as copolymers, blends, and alloys of nylon 66 with nylon 6. The melt point of the polymer for the second nanofiber layer may be preferably 225° C. or greater, e.g., from 225° C. to 350° C. As stated herein, the polymer for the second nanofiber layer may be the same type of polymer used for the first nanofiber layer, e.g., both polyamide, even though the process for producing each layer is different.

In some embodiments, such as that described in U.S. Pat. No. 5,913,993, a small amount of polyethylene polymer can be blended with a nylon compound used to form a second nanofiber layer with desirable characteristics. The addition of polyethylene to nylon enhances specific properties such as softness. The use of polyethylene also lowers cost of production, and eases further downstream processing such as bonding to other fabrics or itself. The improved fabric can be made by adding a small amount of polyethylene to the nylon feed material used in producing a nanofiber melt blown fabric. More specifically, the fabric can be produced by forming a blend of polyethylene and nylon 66, extruding the blend in the form of a plurality of continuous filaments, directing the filaments through a die to melt blow the filaments, depositing the filaments onto a collection surface such that a web is formed.

The polyethylene useful in the process of this embodiment of the subject disclosure preferably may have a melt index between about 5 grams/10 min and about 200 grams/10 min and, e.g., between about 17 grams/10 min and about 150 grams/10 min. The polyethylene should preferably have a density between about 0.85 grams/cc and about 1.1 grams/cc and, e.g., between about 0.93 grams/cc and about 0.95 grams/cc. Most preferably, the melt index of the polyethylene is about 150 grams/10 min and the density is about 0.93 grams/cc.

The polyethylene used in the process of this embodiment of the subject disclosure can be added at a concentration of about 0.05% to about 20%. In a preferred embodiment, the concentration of polyethylene will be between about 0.1% and about 1.2%. Most preferably, the polyethylene will be present at about 0.5%. The concentration of polyethylene in the second nanofiber layer produced according to the method described will be approximately equal to the percentage of polyethylene added during the manufacturing process. Thus, the percentage of polyethylene in the second nanofiber layer of this embodiment of the subject disclosure will typically range from about 0.05% to about 20% and will preferably be about 0.5%. Therefore, the fabric will typically comprise between about 80 and about 99.95 percent by weight of nylon. The filament extrusion step can be carried out between about 250° C. and about 325° C. Preferably, the temperature range is about 280° C. to about 315° C. but may be lower if nylon 6 is used.

The blend or copolymer of polyethylene and nylon can be formed in any suitable manner. Typically, the nylon compound will be nylon 66; however, other polyamides of the nylon family can be used. Also, mixtures of nylons can be used. In one specific example, polyethylene is blended with a mixture of nylon 6 and nylon 66. The polyethylene and nylon polymers are typically supplied in the form of pellets, chips, flakes, and the like. The desired amount of the polyethylene pellets or chips can be blended with the nylon pellets or chips in a suitable mixing device such as a rotary drum tumbler or the like, and the resulting blend can be introduced into the feed hopper of the conventional extruder or the melt blowing line. The blend or copolymer can also be produced by introducing the appropriate mixture into a continuous polymerization spinning system.

Further, differing species of a general polymeric genus can be blended for the second nanofiber layer. For example, a high molecular weight styrene material can be blended with a low molecular weight, high impact polystyrene. A Nylon-6 material can be blended with a nylon copolymer such as a Nylon-6; 66; 6,10 copolymer. Further, a polyvinylalcohol having a low degree of hydrolysis such as a 87% hydrolyzed polyvinylalcohol can be blended with a fully or superhydrolyzed polyvinylalcohol having a degree of hydrolysis between 98 and 99.9% and higher. All of these materials in admixture can be crosslinked using appropriate crosslinking mechanisms. Nylons can be crosslinked using crosslinking agents that are reactive with the nitrogen atom in the amide linkage. Polyvinyl alcohol materials can be crosslinked using hydroxyl reactive materials such as mono-aldehydes, such as formaldehyde, ureas, melamine-formaldehyde resin and its analogues, boric acids and other inorganic compounds, dialdehydes, diacids, urethanes, epoxies and other known crosslinking agents. Crosslinking technology is a well-known and understood phenomenon in which a crosslinking reagent reacts and forms covalent bonds between polymer chains to substantially improve molecular weight, chemical resistance, overall strength and resistance to mechanical degradation.

One preferred polymer blend for the second nanofiber layer is a polyamide comprising a first polymer and a second, but different polymer (differing in polymer type, molecular weight or physical property) that is conditioned or treated at elevated temperature. The polymer blend can be reacted and formed into a single chemical specie or can be physically combined into a blended composition by an annealing process. Annealing implies a physical change, like crystallinity, stress relaxation or orientation. Preferred materials are chemically reacted into a single polymeric specie such that a Differential Scanning calorimeter (DSC) analysis reveals a single polymeric material to yield improved stability when contacted with high temperature, high humidity and difficult operating conditions. Preferred materials for use in the blended polymeric systems include nylon 6; nylon 66; nylon 6,10; nylon (6-66-6,10) copolymers and other linear generally aliphatic nylon compositions.

A suitable polyamide may include for example, 20% nylon 6, 60% nylon 66 and 20% by weight of a polyester. The polyamide may include combinations of miscible polymers or combinations of immiscible polymers.

In some aspects, the polyamide may include nylon 6. In terms of lower limits, the polyamide may include nylon 6 in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 6 in an amount of 99.9 wt. % or less, 99 wt. % or less, 95 wt. % or less, 90 wt. % or less, 85 wt. % or less, or 80 wt. % or less. In terms of ranges, the polyamide may comprise nylon 6 in an amount from 0.1 to 99.9 wt. %, e.g., from 1 to 99 wt. %, from 5 to 95 wt. %, from 10 to 90 wt. %, from 15 to 85 wt. %, or from 20 to 80 wt. %.

In some aspects, the polyamide may include nylon 66. In terms of lower limits, the polyamide may include nylon 66 in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 66 in an amount of 99.9 wt. % or less, 99 wt. % or less, 95 wt. % or less, 90 wt. % or less, 85 wt. % or less, or 80 wt. % or less. In terms of ranges, the polyamide may comprise nylon 66 in an amount from 0.1 to 99.9 wt. %, e.g., from 1 to 99 wt. %, from 5 to 95 wt. %, from 10 to 90 wt. %, from 15 to 85 wt. %, or from 20 to 80 wt. %.

In some aspects, the polyamide may include nylon 6I (such as a copolymer of hexamethylene diamine and isophthalic acid). In terms of lower limits, the polyamide may include nylon 6I in an amount of at least 0.1 wt. %, e.g., at least 0.5 wt. %, at least 1 wt. %, at least 5 wt. %, at least 7.5 wt. %, or at least 10 wt. %. In terms of upper limits, the polyamide may include nylon 6I in an amount of 50 wt. % or less, 40 wt. % or less, 35 wt. % or less, 30 wt. % or less, 25 wt. % or less, or 20 wt. % or less. In terms of ranges, the polyamide may comprise nylon 6I in an amount from 0.1 to 50 wt. %, e.g., from 0.5 to 40 wt. %, from 1 to 35 wt. %, from 5 to 30 wt. %, from 7.5 to 25 wt. %, or from 10 to 20 wt. %.

In some aspects, the polyamide may include nylon 6T (such as a copolymer of hexamethylene diamine and terephthalic acid). In terms of lower limits, the polyamide may include nylon 6T in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 6T in an amount of 50 wt. % or less, 47.5 wt. % or less, 45 wt. % or less, 42.5 wt. % or less, 40 wt. % or less, or 37.5 wt. % or less. In terms of ranges, the polyamide may comprise nylon 6T in an amount from 0.1 to 50 wt. %, e.g., from 1 to 47.5 wt. %, from 5 to 45 wt. %, from 10 to 42.5 wt. %, from 15 to 40 wt. %, or from 20 to 37.5 wt. %.

Block copolymers are also useful in the process of this disclosure. With such copolymers the choice of solvent swelling agent is important. The selected solvent is such that both blocks were soluble in the solvent. One example is an ABA (styrene-EP-styrene) or AB (styrene-EP) polymer in methylene chloride solvent. If one component is not soluble in the solvent, it will form a gel. Examples of such block copolymers are Kraton® type of styrene-b-butadiene and styrene-b-hydrogenated butadiene (ethylene propylene), Pebax® type of e-caprolactam-b-ethylene oxide, Sympatex® polyester-b-ethylene oxide and polyurethanes of ethylene oxide and isocyanates.

Addition polymers like polyvinylidene fluoride, syndiotactic polystyrene, copolymer of vinylidene fluoride and hexafluoropropylene, polyvinyl alcohol, polyvinyl acetate, amorphous addition polymers, such as poly(acrylonitrile) and its copolymers with acrylic acid and methacrylates, polystyrene, poly(vinyl chloride) and its various copolymers, poly(methyl methacrylate) and its various copolymers, are known to be solution spun with relative ease because they are soluble at low pressures and temperatures. It is envisioned these can be melt spun per the instant disclosure as one method of making nanofibers for the second layer.

The physical characteristics of the second layer, i.e. average fiber diameter, median pore size, basis weight, density, surface area, and thickness, may be different from the first layer.

In one embodiment, the melt blown process can produce nanofibers of a polyamide for the second layer having a relatively low oxidative degradation index ("ODI") value. A lower ODI indicates less severe oxidative degradation during manufacture. In some aspects, the ODI may range from 10 to 150. ODI may be measured using gel permeation chromatography (GPC) with a fluorescence detector. The instrument is calibrated with a quinine external standard. 0.1 grams of nylon is dissolved in 10 mL of 90% formic acid. The solution is then analyzed by GPC with the fluorescence detector. The detector wavelengths for ODI are 340 nm for excitation and 415 nm for emission. In terms of upper limits, the ODI of the polyamide nanofiber nonwoven may be 200 or less, e.g., 180 or less, 150 or less, 125 or less, 100 or less, 75 or less, 60 or less, or 50 or less. In terms of the lower limits, the ODI of the polyamide nanofiber for the second layer may be 1 or greater, 5 or greater, 10 or greater, 15 or greater, 20 or greater, or 25 or greater. In terms of ranges, the ODI of the polyamide nanofiber nonwoven may be from 1 to 200, e.g., from 1 to 180, from 1 to 150, from 5 to 125, from 10 to 100, from 1 to 75, from 5 to 60, or from 5 to 50.

Additionally, the melt blown nanofibers for the second layer may have a relatively low thermal degradation index ("TDI"). A lower TDI indicates a less severe thermal history of the polyamide during manufacture. TDI is measured the same as ODI, except that the detector wavelengths for TDI are 300 nm for excitation and 338 nm for emission. In terms of upper limits, the TDI of the polyamide nanofiber nonwoven may be 4000 or less, e.g., 3500 or less, 3100 or less, 2500 or less, 2000 or less, 1000 or less, 750 or less, or 700 or less. In terms of the lower limits, the TDI of the polyamide nanofiber nonwoven may be 20 or greater, 100 or greater, 125 or greater, 150 or greater, 175 or greater, 200 or greater, or 210 or greater. In terms of ranges, the TDI of the polyamide nanofiber nonwoven may be from 20 to 400, 100 to 4000, from 125 to 3500, from 150 to 3100, from 175 to 2500, from 200 to 2000, from 210 to 1000, from 200 to 750, or from 200 to 700.

TDI and ODI test methods are also disclosed in U.S. Pat. No. 5,411,710. Lower TDI and/or ODI values are beneficial because they indicate that the second nanofiber layer is more durable due to the greater TDI and/or ODI. As explained above, TDI and ODI are measures of degradation and a product with greater degradation would not perform as well. For example, such a product may have reduced dye uptake, lower heat stability, lower life in a filtration application where the fibers are exposed to heat, pressure, oxygen, or any combination of these, and lower tenacity in industrial fiber applications.

4. Additives

In some embodiments, the nanofibers in the first and/or second layer may include an additive. Different additives may be added to each layer. Examples of suitable additives include oils (such as finishing oils, e.g., silicone oils), waxes, solvents (including formic acid as described herein), lubricants (e.g., paraffin oils, amide waxes, and stearates), stabilizers (e.g., photostabilizers, UV stabilizers, etc.), delusterants, antioxidants, colorants, biocides (e.g., antimicrobials or antivirals), pigments, and dyes. The additives may be present in a total amount of up to 49 wt. % of the first and/or second layer, e.g., up to 40 wt. %, up to 30 wt. %, up to 20 wt. %, up to 10 wt. %, up to 5 wt. %, up to 3 wt. %, or up to 1 wt. %. In terms of lower limits, the additives may be present in the nanofiber product in an amount of at least 0.01 wt. %, e.g., at least 0.05 wt. %, at least 0.1 wt. %, at least 0.25 wt. %, or at least 0.5 wt. %. In terms of ranges, the additives may be present in the nanofiber product in an amount from 0.01 to 49 wt. %, e.g., from 0.05 to 40 wt. %, from 0.1 to 30 wt. %, from 0.25 to 20 wt. %, from 0.5 to 10 wt. %, from 0.5 to 5 wt. %, or from 0.5 to 1 wt. %. In some aspects, monomers and/or polymers may be included as additives. For example, nylon 6I and/or nylon 6T may be added as an additive.

Antioxidants suitable for use in conjunction with the first and/or second layer described herein may, in some embodiments, include, but are not limited to, anthocyanin, ascorbic acid, glutathione, lipoic acid, uric acid, resveratrol, flavonoids, carotenes (e.g., beta-carotene), carotenoids, tocopherols (e.g., alpha-tocopherol, beta-tocopherol, gamma-tocopherol, and delta-tocopherol), tocotrienols, ubiquinol, gallic acids, melatonin, secondary aromatic amines, benzofuranones, hindered phenols, polyphenols, hindered amines, organophosphorus compounds, thioesters, benzoates, lactones, hydroxylamines, and the like, and any combination thereof. In some embodiments, the antioxidant may be selected from the group consisting of stearyl 3-(3,5-di-tert-butyl-4-hydroxyphenyl) propionate, bis(2,4-dicumylphenyl)pentaerythritol diphosphite, tris(2,4-di-tert-butylphenyl)phosphite, bisphenol A propoxylate diglycidyl ether, 9,10-dihydroxy-9-oxa-10-phosphaphenanthrene-10-oxide and mixtures thereof.

Colorants, pigments, and dyes suitable for use in conjunction with the first and/or second layer described herein may, in some embodiments, include, but are not limited to, plant dyes, vegetable dyes, titanium dioxide (which may also act as a delusterant), carbon black, charcoal, silicon dioxide, tartrazine, E102, phthalocyanine blue, phthalocyanine green, quinacridones, perylene tetracarboxylic acid di-imides, dioxazines, perinones disazo pigments, anthraquinone pigments, metal powders, iron oxide, ultramarine, nickel titanate, benzimidazolone orange gl, solvent orange 60, orange dyes, calcium carbonate, kaolin clay, aluminum hydroxide, barium sulfate, zinc oxide, aluminum oxide, CARTASOL® dyes (cationic dyes, available from Clariant Services) in liquid and/or granular form (e.g., CARTASOL Brilliant Yellow K-6G liquid, CARTASOL Yellow K-4GL liquid, CARTASOL Yellow K-GL liquid, CARTASOL Orange K-3GL liquid, CARTASOL Scarlet K-2GL liquid, CARTASOL Red K-3BN liquid, CARTASOL Blue K-5R liquid, CARTASOL Blue K-RL liquid, CARTASOL Turquoise K-RL liquid/granules, CARTASOL Brown K-BL liquid), FASTUSOL® dyes (an auxochrome, available from BASF) (e.g., Yellow 3GL, Fastusol C Blue 74L), and the like, any derivative thereof, and any combination thereof. In some embodiments, solvent dyes may be employed.

5. Uses

In combining the physical properties of the first nanofiber layer and the second nanofiber layer the nonwoven multilayer structures may be useful in a variety of applications due to their high temperature resistance, barrier, permeability properties, and, processability. The improved characteristics of the nonwoven multilayer structures of the disclosure provide a wide range of functionality and improved benefits.

Multilayer structures described herein may be useful for, but are not limited to, air and liquid filtration, textiles including breathable fabrics for apparel, acoustics, composites and packaging, consumer products, medical applications, portions of furniture, electronic housing, as well as other molded applications. By way of example, the nonwoven multilayer structures may be used in the preparation of a filter, e.g., an air filter, a HEPA filter, an automotive cabin air filter, or an aircraft air filter. The nonwoven multilayer structures are useful for sound dampening in automotive, electronic and aircraft applications which may require composites of different fiber sizes for best performance. At higher basis weights, the nonwoven multilayer structures are used in connection with beverages, food packaging, transportation, chemical processing and medical applications such as wound dressings or medical implants. The multilayer structures may be used as a barrier for absorbent materials, such as diapers, training pants, adult incontinence pads, catamenials products such as feminine care pads and pantiliners, tampons, personal cleansing articles, personal care articles, and personal care wipes including baby wipes, facial wipes, body wipes, and feminine wipes. For medical application, the multilayer structures described herein may be as masks (surgical mask, a procedure mask, a medical mask, and/or a dust mask), wipes, towels, towns, protective clothing, or protect nets, optionally in combination with antiviral additives, such as zinc compounds. In addition, the multilayer structures may be used in textiles for medical applications such as medical gown, a medical mask, a medical drape, a patient transfer slip sheet, curtains, and bedding, as well as equipment such as monitor equipment (e.g., a blood pressure monitor or an ultrasound probe), radiology equipment (e.g., a portion of an MRI machine or a CT machine), a ventilator, or a patient transfer sheet.

Hereinafter, the present invention will be better understood in view of the following non-limiting example.

EXAMPLES

Comparative Example A—Melt Blown Nanofiber on Spun Bond Scrim

A nanofiber layer of polyamide 66 was melt spun and deposited onto a 10 gsm thermally bonded, nylon spun bond scrim commercially available from Cerex Advanced Fabrics, Inc. under the trademark PBN-II™. No solvents or adhesives were used during the melt spinning or deposition processes, and neither the polyamide nor the resultant product contained solvent. The melt blown nanofiber layer had basis weight of 10.4 gsm, an average fiber diameter of 309 nm and a relative viscosity of 25.1. A scanning electron microscope (SEM) was used to measure the fiber diameter of the meltspun nanofiber layer. The scrim had a fiber diameter median of about 2.4 microns. After the meltspun nanofiber layer was added to the scrim, the thickness was 230 microns. The properties of this nonwoven multilayer structures are included in the Tables below.

Examples 1-4

Polyamide 66 fibers having fiber diameters from 200 to 300 nanometers were electrospun onto the nonwoven multilayer structure of Example A, as shown in Table 1. The electrospun nanofibers were prepared using electrospinning equipment and processes described in U.S. Pat. Nos. 8,231,822 and 9,279,195.

The Examples and Comparative Example were tested for basis weight, air permeability, mean flow pore diameter, bubble point and filtration efficiency. The improvements in air permeability, mean flow pore diameter, bubble point and filtration efficiency are shown in Table 1. Most notably the data indicate that filtration efficiency was improved by including an electrospun nanofiber directly on a melt blown nanofiber layer. Unless described elsewhere, the test for each of these properties is provided herein.

SEM observations were used to measure the fiber diameter of the electrospun nanofiber layer.

For purposes of measuring filtration efficiency and resistance, a TSI filter tester was used with a standard 3.5 micron particle size. The filtration efficiency and resistance measurements were conducted on flat-sheet media using automated filter test (TSI Model No. 8130) with a circular opening of 11.3 cm diameter (area=100 cm$^2$). A 2 wt % sodium chloride aqueous solution was used to generate fine aerosol with a mass mean diameter of 0.26 micron. The air flow rate was 40 liter/min which corresponded to a face velocity of 6.67 cm/s. Filtration efficiency and initial pressure drop were measured and recorded at the beginning of the test. Basis Weight was determined by ASTM D-3776 and reported in gsm.

Air permeability was measured using a Textest 3300, test area was 20 cm$^2$. Penetration and resistance was tested with ATI/DOP air permeability tested using 32 L/min challenge fluid, after discharging in IPA vapors (minimum of 4 hours). Mean flow pore diameter and bubble point was tested using a porometer from PMI, model CFP1200AEL and a Galwixk solution, minimum pressure at 0 kPa.

TABLE 1

Nonwoven Multilayer Structures with Electrospun Nanofibers (200-300 nm)

|  | Example A | Example 1 | Example 2 | Example 3 | Example 4 |
|---|---|---|---|---|---|
| Electrospun Layer |  |  |  |  |  |
| Basis Weight (gsm) | — | 0.35 | 0.87 | 2.05 | 4.02 |
| Fiber Diameter (nm) | — | 233 | 283 | 247 | 286 |
| Nonwoven multilayer |  |  |  |  |  |
| Air Permeability @ 200 Pa (l/m²/sec) | 195 | 113 | 61 | 44.5 | 21.2 |
| Mean Flow Pore Diameter (microns) | 5.4 | 1.1 | 1.1 | 1.13 | 0.57 |
| Bubble point (microns) | 12.8 | 5.3 | 2.2 | 3.91 | 1.22 |
| Filtration Efficiency (%) | 60.8 | 93.834 | 98.887 | 98.981 | 99.996 |
| Resistance (Pa) | 57.7 | 115 | 188 | 209 | 636 |

Table 1 indicates that adding the electrospun layer significantly and unexpectedly improves the filtration efficiency as its basis weight is increased. In particular, significant improvements in filtration were achieved with electrospun layers having an average fiber diameter from 200 to 300 nm (93.834% and higher vs. 60.8%). Significant improvements in air permeability and bubble point were also demonstrated.

Examples 5-8

Polyamide 66 fibers having fiber diameters from 100 to 200 nanometers were electrospun onto the nonwoven multilayer structure of Example A, as shown in Table 2. The fibers were prepared using electrospinning equipment described in Examples 1-4. The Examples were tested for basis weight, air permeability, mean flow pore diameter, bubble point and filtration efficiency. The improvements in air permeability, mean flow pore diameter, bubble point and filtration efficiency are shown in Table 2. Most notably the data indicate that filtration efficiency was improved by including an electrospun nanofiber directly on a melt blown nanofiber layer. In particular, the improvement provided by the electrospun nanofiber is shown for the low basis weight layer in Example 5.

TABLE 2

Nonwoven Multilayer Structures with Electrospun Nanofibers (100-200 nm)

|  | Example A | Example 5 | Example 6 | Example 7 | Example 8 |
|---|---|---|---|---|---|
| Electrospun Layer |  |  |  |  |  |
| Basis Weight (gsm) | — | 0.48 | 1.12 | 3.03 | 5.19 |
| Fiber Diameter (nm) | — | 105 | 145 | 143 | 116 |
| Nonwoven multilayer |  |  |  |  |  |
| Air Permeability @ 200 Pa (l/m²/sec) | 195 | 44.1 | 24.2 | 13.4 | 6 |
| Mean Flow Pore Diameter (microns) | 5.4 | 0.414 | 0.339 | 0.314 | 0.221 |
| Bubble point (microns) | 12.8 | 0.692 | 0.79 | 0.523 | 0.464 |
| Filtration Efficiency (%) | 60.8 | 99.509 | 99.999 | >99.999 | >99.999 |
| Resistance (Pa) | 57.7 | 320 | 537 | >970 | >970 |

Table 2 indicates that adding the electrospun layer improves the filtration efficiency as its basis weight is increased. In particular, significant improvements in filtration were achieved with electrospun layers having an average fiber diameter from 100 to 200 nm (99.509% and higher vs. 60.8%) Significant improvements in air permeability and bubble point were also demonstrated.

Examples 9-12

Polyamide 66 fibers having fiber diameters less than 100 nanometers were electrospun onto the nonwoven multilayer structure of Example A, as shown in Table 3. The fibers were prepared using electrospinning equipment described in Examples 1-4. The Examples were tested for basis weight, air permeability, mean flow pore diameter, bubble point and filtration efficiency. The improvements in air permeability, mean flow pore diameter, bubble point and filtration efficiency are shown in Table 3. The data again indicate that filtration efficiency was improved by including an electrospun nanofiber directly on a melt blown nanofiber layer.

TABLE 3

Nonwoven Multilayer Structures with Electrospun Nanofibers (<100 nm)

|  | Example A | Example 9 | Example 10 | Example 11 | Example 12 |
|---|---|---|---|---|---|
| Electrospun Layer |  |  |  |  |  |
| Basis Weight (gsm) | — | 0.29 | 0.61 | 1.26 | 2.48 |
| Fiber Diameter (nm) | — | <100 | 49 | 63 | 50 |
| Nonwoven multilayer |  |  |  |  |  |
| Air Permeability @ 200 Pa (l/m²/sec) | 195 | 38.1 | 18.7 | 8.6 | 4.9 |
| Mean Flow Pore Diameter (microns) | 5.4 | — | — | 0.13 | 0.107 |
| Bubble point (microns) | 12.8 | 1.018 | 0.63 | 0.2 | 0.173 |
| Filtration Efficiency (%) | 60.8 | 99.748 | 99.988 | >99.999 | >99.999 |
| Resistance (Pa) | 57.7 | 423 | 670 | >970 | >970 |

Table 3 indicates that adding the electrospun layer improves the filtration efficiency as its basis weight is increased. In particular, significant improvements in filtration were achieved with electrospun layers having an average fiber diameter of less than 100 nm. Significant improvements in air permeability and bubble point were also demonstrated.

Examples 13-15

Polyurethane fibers having fiber diameters greater than 300 nanometers were electrospun onto the nonwoven multilayer structure of Example A, as shown in Table 4. The Examples were tested for basis weight, air permeability, and water column. The improvements in air permeability and water column are shown in Table 4.

Air Permeability was measured using a Textest 3300. Water column was measured using a Hydostatic Head Tester FX3000, measured with protective mesh on the top of the nonwoven multilayer, based on ISO 811, pressure increase 150 cm WC/min.

|  | Example A | Example 13 | Example 14 | Example 15 |
|---|---|---|---|---|
| Electrospun Layer |  |  |  |  |
| Basis Weight (gsm) | — | 11.5 | 8.3 | 11.9 |
| Fiber Diameter (nm) | — | 415 | 765 | 575 |
| Nonwoven multilayer |  |  |  |  |
| Air Permeability @ 125 Pa (cfm) | 121 | 0.65 | 4.3 | 5.5 |
| Water column (cm) | 0 | 868 | 101 | 330 |

Table 4 indicates that significant improvements in air permeability and water column were achieved.

Embodiments

The following embodiments are contemplated. All combinations of features and embodiments are contemplated.

Embodiment 1: A nonwoven multilayer structure comprising: a first nonwoven layer having melt or solvent electrospun nanofibers; and a second nonwoven layer having a first surface and comprising melt blown nanofibers, wherein the first layer is adjacent to at least the first surface.

Embodiment 2: An embodiment of embodiment 1, wherein the melt or solvent electrospun nanofibers have an average fiber diameter that is less than or equal to 300 nanometers, preferably less than or equal to 150 nanometers.

Embodiment 3: An embodiment of embodiments 1 or 2, wherein the melt blown nanofibers have an average fiber diameter that is from 250 nm to 950 nm.

Embodiment 4: An embodiment of any one of embodiments 1 to 3, wherein the basis weight of the first nonwoven layer is less than second nonwoven layer.

Embodiment 5: An embodiment of any one of embodiments 1 to 4, wherein the basis weight of the first nonwoven layer is less than or equal to 25 gsm.

Embodiment 6: An embodiment of any one of embodiments 1 to 5, wherein the basis weight of the second nonwoven layer is from 0.9 to 50 gsm.

Embodiment 7: An embodiment of any one of embodiments 1 to 6, wherein less than 20% of the electrospun nanofibers have a diameter of greater than 100 nanometers.

Embodiment 8: An embodiment of any one of embodiments 1 to 7, wherein no more than 20% of the meltblown nanofibers have a diameter of greater than 700 nanometers.

Embodiment 9: An embodiment of any one of embodiments 1 to 8, wherein first nonwoven layer comprises a first polymer and the second nonwoven layer comprises a second polymer, preferably wherein the first polymer is different than the second polymer.

Embodiment 10: An embodiment of embodiment 9, wherein the second polymer has relative viscosity (RV) from 2 to 330.

Embodiment 11: An embodiment of any one of embodiments 1 to 9, wherein the first polymer comprises polyimide, polyolefin, polyamide, polyester, polystyrene, polyacrylonitrile, polyurethane, polylactic acid, polycaprolactone, polysulfone, fluoropolymer, polyacrylonitrile, polymethyl methacrylate, polystyrene, poly(vinyl chloride), poly(vinyl alcohol), poly(vinyl butylene), poly(vinylidene fluoride), polybutylene terephthalate, cellulose, and copolymers or derivative compounds thereof, or combinations thereof.

Embodiment 12: An embodiment of any one of embodiments 1 to 10, wherein the second polymer polyamide, polyolefin, polyester, polystyrene, polyacrylonitrile, polyurethane, polyimide, polylactic acid, polycaprolactone, polysulfone, fluoropolymer, polyacrylonitrile, polymethyl methacrylate, polystyrene, poly(vinyl chloride), poly(vinyl alcohol), poly(vinyl butylene), poly(vinylidene fluoride), polybutylene terephthalate, cellulose, and copolymers or derivative compounds thereof, or combinations thereof.

Embodiment 13: An embodiment of any one of embodiments 1 to 12, wherein the second polymer comprises polyamides.

Embodiment 14: An embodiment of any one of embodiments 1 to 13, wherein the second polymer comprises polyamide 66.

Embodiment 15: An embodiment of any one of embodiments 1 to 14, wherein the first nonwoven layer is less than or equal to 30 microns in thickness.

Embodiment 16: An embodiment of any one of embodiments 1 to 15, wherein the second nonwoven layer is from 5 to 500 microns in thickness.

Embodiment 17: An embodiment of any one of embodiments 1 to 16, The nonwoven multilayer structure of any one of claims 1 to 16, wherein the first nonwoven layer has a median pore size from 0.01 to 10 microns.

Embodiment 18: An embodiment of any one of embodiments 1 to 17, wherein the second nonwoven layer has a median pore size greater than 1 micron.

Embodiment 19: An embodiment of any one of embodiments 1 to 18, wherein the ratio of the median pore size ratio of the first nonwoven layer to the second nonwoven layer is from 1:1 to 1:100.

Embodiment 20: An embodiment of any one of embodiments 1 to 19, wherein the second nonwoven layer comprises a second surface, and wherein a scrim layer is adjacent to the second layer.

Embodiment 21: An embodiment of any one of embodiments 1 to 20, wherein the second nonwoven layer has an oxidation degradation index (ODI) of less than 200.

Embodiment 22: An embodiment of any one of embodiments 1 to 21, wherein the second nonwoven layer has a thermal degradation index (TDI) of less than 4000.

Embodiment 23: A nonwoven multilayer structure comprising:
(a) a first nonwoven layer having first nanofibers having at least one, preferably two or more, of the following first properties (a1) to (a4): (a1) an average fiber diameter from 1 to 300 nm, preferably from 1 to 150 nm; (a2) a basis weight from 0.0001 to 25 gsm; (a3) a median pore size from 0.01 to 10 microns; or (a4) an average thickness of less than or equal to 30 microns; and (b) a second nonwoven layer having second nanofibers having at least one, preferably two or more, of the following second properties (b1) to (b7): (b1) an average fiber diameter from 250 to 950 nm; (b2) a basis weight from 0.9 to 50 gsm; (b3) a median pore size greater than 1 micron; (b4) an average thickness from 5 to 500 microns; (b5) less than 1 wt. % solvent; (b6) thermal degradation index of less than 4000; or (b7) oxidative degradation index of less than 200;

wherein the first property is different from the second property.

Embodiment 24: An embodiment of embodiment 23, wherein first nonwoven layer comprises a first polymer and the second nonwoven layer comprises a second polymer, preferably wherein the first polymer is different than the second polymer.

Embodiment 25: An embodiment of embodiments 23 or 24, wherein the second polymer has relative viscosity (RV) from 2 to 330.

Embodiment 26: An embodiment of any one of embodiments 23 to 25, wherein the first polymer comprises polyimide, polyolefin, polyamide, polyester, polystyrene, polyacrylonitrile, polyurethane, polylactic acid, polycaprolactone, polysulfone, fluoropolymer, polyacrylonitrile, polymethyl methacrylate, polystyrene, poly(vinyl chloride), poly(vinyl alcohol), poly(vinyl butylene), poly(vinylidene fluoride), polybutylene terephthalate, cellulose, and copolymers or derivative compounds thereof, and combinations thereof.

Embodiment 27: An embodiment of any one of embodiments 23 to 26, wherein the second polymer polyamide, polyolefin, polyester, polystyrene, polyacrylonitrile, polyurethane, polyimide, polylactic acid, polycaprolactone, polysulfone, fluoropolymer, polyacrylonitrile, polymethyl methacrylate, polystyrene, poly(vinyl chloride), poly(vinyl alcohol), poly(vinyl butylene), poly(vinylidene fluoride), polybutylene terephthalate, cellulose, and copolymers or derivative compounds thereof, and combinations thereof.

Embodiment 28: An embodiment of any one of embodiments 23 to 27, wherein the second polymer comprises polyamides.

Embodiment 29: An embodiment of any one of embodiments 23 to 28, wherein the second polymer comprises polyamide 66.

Embodiment 30: A nonwoven multilayer structure comprising: a first nonwoven layer having a nanofiber; and a second nonwoven layer comprising melt blown nanofibers of a second polymer and having a first surface, wherein the second polymer is a polyamide, and wherein the first layer is adjacent to at least the first surface.

Embodiment 31: An embodiment of embodiment 29, wherein the second polymer comprises polyamide 66, and preferably the first nonwoven layer comprises a first polymer comprising polyamide.

Embodiment 32: A nonwoven multilayer structure comprising: a first nonwoven layer comprising first fibers having median pore size from 0.01 to 10 microns; and a second nonwoven layer comprising second fibers, and having a first surface, wherein the fibers have an average fiber diameter that is from 250 nm to 950 nm, wherein the first layer is adjacent to at least the first surface.

Embodiment 33: An embodiment of embodiment 32, wherein the first fibers have an average fiber diameter that is less than or equal to 300 nanometers, preferably less than or equal to 150 nanometers.

Embodiment 34: An embodiment of embodiments 32 or 33, wherein the second fibers have an average fiber diameter that is from 250 nm to 950 nm.

Embodiment 35: An embodiment of any one of embodiments 32 to 34, wherein the basis weight of the first nonwoven layer is less than second nonwoven layer.

Embodiment 36: An embodiment of any one of embodiments 32 to 35, wherein the basis weight of the first nonwoven layer is less than or equal to 25 gsm.

Embodiment 37: An embodiment of any one of embodiments 32 to 36, wherein the basis weight of the second nonwoven layer is from 0.9 to 50 gsm.

Embodiment 38: An embodiment of any one of embodiments 32 to 37, wherein less than 20% of the first fibers have a diameter of greater than 100 nanometers.

Embodiment 39: An embodiment of any one of embodiments 32 to 38, wherein no more than 20% of the second fibers have a diameter of greater than 700 nanometers.

Embodiment 40: An embodiment of any one of embodiments 32 to 39, wherein first nonwoven layer comprises a first polymer and the second nonwoven layer comprises a second polymer, preferably wherein the first polymer is different than the second polymer.

Embodiment 41: An embodiment of embodiment 40, wherein the second polymer has relative viscosity (RV) from 2 to 330.

Embodiment 42: An embodiment of embodiments 40 or 41, wherein the first polymer comprises polyimide, polyolefin, polyamide, polyester, polystyrene, polyacrylonitrile, polyurethane, polylactic acid, polycaprolactone, polysulfone, fluoropolymer, polyacrylonitrile, polymethyl methacrylate, polystyrene, poly(vinyl chloride), poly(vinyl alcohol), poly(vinyl butylene), poly(vinylidene fluoride), polybutylene terephthalate, cellulose, and copolymers or derivative compounds thereof, and combinations thereof.

Embodiment 43: An embodiment of embodiments 40 to 42, wherein the second polymer polyamide, polyolefin, polyester, polystyrene, polyacrylonitrile, polyurethane, polyimide, polylactic acid, polycaprolactone, polysulfone, fluoropolymer, polyacrylonitrile, polymethyl methacrylate, polystyrene, poly(vinyl chloride), poly(vinyl alcohol), poly(vinyl butylene), poly(vinylidene fluoride), polybutylene terephthalate, cellulose, and copolymers or derivative compounds thereof, and combinations thereof.

Embodiment 44: An embodiment of embodiments 40 to 43, wherein the second polymer comprises polyamides.

Embodiment 45: An embodiment of embodiments 40 to 44, wherein the second polymer comprises polyamide 66.

Embodiment 46: An embodiment of embodiments 32 to 45, wherein the first nonwoven layer is less than or equal to 30 microns in thickness.

Embodiment 47: An embodiment of embodiments 32 to 46, wherein the second nonwoven layer is from 5 to 500 microns in thickness.

Embodiment 48: An embodiment of embodiments 32 to 47, wherein the first nonwoven layer has a median pore size from 0.1 to 3 microns.

Embodiment 49: An embodiment of embodiments 32 to 48, wherein the second nonwoven layer has a median pore size greater than 1 micron.

Embodiment 50: An embodiment of embodiments 32 to 49, wherein the ratio of the median pore size ratio of the first nonwoven layer to the second nonwoven layer is from 1:1 to 1:100.

Embodiment 51: An embodiment of embodiments 32 to 50, wherein the second nonwoven layer comprises a second surface, and wherein a scrim layer is adjacent to the second nonwoven layer.

Embodiment 52: An embodiment of embodiments 32 to 51, wherein the second nonwoven layer has an oxidation degradation index (ODI) of less than 200.

Embodiment 53: An embodiment of embodiments 32 to 52, wherein the second nonwoven layer has a thermal degradation index (TDI) of less than 4000.

Embodiment 54: A nonwoven multilayer structure comprising:

a first nonwoven layer comprising first fibers having a basis weight of less than or equal to 25 gsm; and a second nonwoven layer comprising second fibers, and having a first surface, wherein the fibers have an average fiber diameter that is from 250 nm to 950 nm, wherein the first layer is adjacent to at least the first surface.

Embodiment 55: An embodiment of embodiment 54, wherein the first fibers have an average fiber diameter that is less than or equal to 150 nanometer, preferably less than or equal to 150 nanometers.

Embodiment 56: An embodiment of embodiments 54 or 55, wherein the second fibers have an average fiber diameter that is from 250 nm to 950 nm.

Embodiment 57: An embodiment of embodiments 54 to 56, wherein the basis weight of the first nonwoven layer is less than second nonwoven layer.

Embodiment 58: An embodiment of embodiments 54 to 57, wherein the basis weight of the first nonwoven layer is less than or equal to 5 gsm.

Embodiment 59: An embodiment of embodiments 54 to 58, wherein the basis weight of the second nonwoven layer is from 0.9 to 50 gsm.

Embodiment 60: An embodiment of embodiments 54 to 59, wherein less than 20% of the first fibers have a diameter of greater than 100 nanometers.

Embodiment 61: An embodiment of embodiments 54 to 60, wherein no more than 20% of the second fibers have a diameter of greater than 700 nanometers.

Embodiment 62: An embodiment of embodiments 54 to 61, wherein first nonwoven layer comprises a first polymer and the second nonwoven layer comprises a second polymer, preferably wherein the first polymer is different than the second polymer.

Embodiment 63: An embodiment of embodiments 54 to 62, wherein the second polymer has relative viscosity (RV) from 2 to 330.

Embodiment 64: An embodiment of embodiments 54 to 63, wherein the first polymer comprises polyimide, polyolefin, polyamide, polyester, polystyrene, polyacrylonitrile, polyurethane, polylactic acid, polycaprolactone, polysulfone, fluoropolymer, polyacrylonitrile, polymethyl methacrylate, polystyrene, poly(vinyl chloride), poly(vinyl alcohol), poly(vinyl butylene), poly(vinylidene fluoride), polybutylene terephthalate, cellulose, and copolymers or derivative compounds thereof, and combinations thereof.

Embodiment 65: An embodiment of embodiments 54 to 64, wherein the second polymer polyamide, polyolefin, polyester, polystyrene, polyacrylonitrile, polyurethane, polyimide, polylactic acid, polycaprolactone, polysulfone, fluoropolymer, polyacrylonitrile, polymethyl methacrylate, polystyrene, poly(vinyl chloride), poly(vinyl alcohol), poly(vinyl butylene), poly(vinylidene fluoride), polybutylene terephthalate, cellulose, and copolymers or derivative compounds thereof, and combinations thereof.

Embodiment 66: An embodiment of 65, wherein the second polymer comprises polyamides.

Embodiment 67: An embodiment of 65, wherein the second polymer comprises polyamide 66.

Embodiment 68: An embodiment of embodiments 54 to 67, wherein the first nonwoven layer is less than or equal to 30 microns in thickness.

Embodiment 69: An embodiment of embodiments 54 to 68, wherein the second nonwoven layer is from 5 to 500 microns in thickness.

Embodiment 70: An embodiment of embodiments 54 to 69, wherein the first nonwoven layer has a median pore size from 0.01 to 10 microns.

Embodiment 71: An embodiment of embodiments 54 to 70, wherein the second nonwoven layer has a median pore size greater than 1 micron.

Embodiment 72: An embodiment of embodiments 54 to 71, wherein the ratio of the median pore size ratio of the first nonwoven layer to the second nonwoven layer is from 1:1 to 1:100.

Embodiment 73: An embodiment of embodiments 54 to 72, wherein the second nonwoven layer comprises a second surface, and wherein a scrim layer is adjacent to the second nonwoven layer.

Embodiment 74: An embodiment of embodiments 54 to 73, wherein the second nonwoven layer has an oxidation degradation index (ODI) of less than 200.

Embodiment 75: An embodiment of embodiments 54 to 74, wherein the second nonwoven layer has a thermal degradation index (TDI) of less than 4000.

Embodiment 76: A nonwoven multilayer structure comprising: a first nonwoven layer comprising fibers of a first polymer, wherein the fibers have an average fiber diameter that is less than or equal to 300 nanometers, preferably less than or equal to 150 nanometers; and a second nonwoven layer comprising fibers of a second polymer, and having a first surface, wherein the fibers have an average fiber diameter that is from 250 nm to 950 nm, wherein the first layer is adjacent to at least the first surface.

Embodiment 77: An embodiment of embodiment 76, wherein the basis weight of the first nonwoven layer is less than second nonwoven layer.

Embodiment 78: An embodiment of embodiments 76 or 77, wherein the basis weight of the first nonwoven layer is less than or equal to 25 gsm.

Embodiment 79: An embodiment of embodiments 76 to 78, wherein the basis weight of the second nonwoven layer is from 0.9 to 50 gsm.

Embodiment 80: An embodiment of embodiments 76 to 79, wherein less than 20% of the fibers of a the first polymer have a diameter of greater than 100 nanometers.

Embodiment 81: An embodiment of embodiments 76 to 80, wherein no more than 20% of the fibers of the second polymer have a diameter of greater than 700 nanometers.

Embodiment 82: An embodiment of embodiments 76 to 81, preferably wherein the first polymer is different than the second polymer.

Embodiment 83: An embodiment of embodiments 76 to 82, wherein the first polymer is the same as the second polymer.

Embodiment 84: An embodiment of embodiments 76 to 83, wherein the second polymer has relative viscosity (RV) from 2 to 330.

Embodiment 85: An embodiment of embodiments 76 to 84, wherein the first polymer comprises polyimide, polyolefin, polyamide, polyester, polystyrene, polyacrylonitrile, polyurethane, polylactic acid, polycaprolactone, polysulfone, fluoropolymer, polyacrylonitrile, polymethyl methacrylate, polystyrene, poly(vinyl chloride), poly(vinyl alcohol), poly(vinyl butylene), poly(vinylidene fluoride), polybutylene terephthalate, cellulose, and copolymers or derivative compounds thereof, and combinations thereof.

Embodiment 86: An embodiment of embodiments 76 to 85, wherein the second polymer polyamide, polyolefin, polyester, polystyrene, polyacrylonitrile, polyurethane, polyimide, polylactic acid, polycaprolactone, polysulfone, fluoropolymer, polyacrylonitrile, polymethyl methacrylate, polystyrene, poly(vinyl chloride), poly(vinyl alcohol), poly(vinyl butylene), poly(vinylidene fluoride), polybutylene terephthalate, cellulose, and copolymers or derivative compounds thereof, and combinations thereof.

Embodiment 87: An embodiment of embodiments 76 to 86, wherein the second polymer comprises polyamides.

Embodiment 88: An embodiment of embodiments 76 to 87, wherein the second polymer comprises polyamide 66.

Embodiment 89: An embodiment of embodiments 76 to 88, wherein the first nonwoven layer is less than or equal to 30 microns in thickness.

Embodiment 90: An embodiment of embodiments 76 to 89, wherein the second nonwoven layer is from 5 to 500 microns in thickness.

Embodiment 91: An embodiment of embodiments 76 to 90, wherein the first nonwoven layer has an average pore size from 0.01 to 100 microns.

Embodiment 92: An embodiment of embodiments 76 to 91, wherein the second nonwoven layer has an average pore size that is greater than or equal to 1 micron.

Embodiment 93: An embodiment of embodiments 76 to 92, wherein the ratio of the median pore size ratio of the first nonwoven layer to the second nonwoven layer is from 1:1 to 1:100.

Embodiment 94: An embodiment of embodiments 76 to 93, wherein the second nonwoven layer comprises a second surface, and wherein a scrim layer is adjacent to the second nonwoven layer.

Embodiment 95: An embodiment of embodiments 76 to 94, wherein the second nonwoven layer has an oxidation degradation index (ODI) of less than 200.

Embodiment 96: An embodiment of embodiments 76 to 95, wherein the second nonwoven layer has a thermal degradation index (TDI) of less than 4000.

Embodiment 97: A process for producing a nonwoven multilayer structure, comprising: melt blowing a polymer having a relative viscosity (RV) from 2 to 330 to form a nonwoven layer comprising nanofibers; and electrospinning a polymer solution or polymer melt onto the nonwoven layer.

Embodiment 98: A nonwoven multilayer structure comprising: a first nonwoven layer having melt or solvent electrospun nanofibers, wherein the melt or solvent electrospun nanofibers have an average fiber diameter that is not less than 300 nanometers; and a second nonwoven layer comprising melt blown nanofibers, wherein the first layer is adjacent to at least the first surface.

Embodiment 99: An embodiment of embodiment 98, wherein the melt or solvent electrospun nanofibers have an average fiber diameter from 300 to 1000 nanometers.

Embodiment 100: An embodiment of embodiment 98 or 99, wherein the melt or solvent electrospun nanofibers is a polyurethane.

Embodiment 101: An embodiment of embodiments 1 to 100, wherein the multilayer structure has a reduction in air permeability from the second meltblown layer of 6% or more.

Embodiment 102: An embodiment of embodiments 1 to 100, wherein the multilayer structure a reduction in the mean flow pore diameter from the second meltblown layer of 50% or more.

Embodiment 103: An embodiment of embodiments 1 to 100, wherein the multilayer structure has a reduction in the bubble point from the second meltblown layer of 50% or more.

Embodiment 104: An embodiment of embodiments 1 to 100, wherein the multilayer structure has an increase in filtration efficiency from the second meltblown layer of 50% or more.

While the disclosure has been described in detail, modifications within the spirit and scope of the disclosure will be readily apparent to those of skill in the art. Such modifications are also to be considered as part of the present disclosure. In view of the foregoing discussion, relevant knowledge in the art and references discussed above in connection with the Background, the disclosures of which are all incorporated herein by reference, further description is deemed unnecessary. In addition, it should be understood from the foregoing discussion that aspects of the disclosure and portions of various embodiments may be combined or interchanged either in whole or in part. Furthermore, those of ordinary skill in the art will appreciate that the foregoing description is by way of example only, and is not intended to limit the disclosure. Finally, all patents, publications, and applications referenced herein are incorporated by reference in their entireties.

What is claimed is:

1. A nonwoven multilayer structure comprising:
   a first nonwoven layer having melt or solvent electrospun nanofibers, wherein the first nonwoven layer comprises polyamide 66 and has a median pore size from 0.01 microns to 0.414 microns; and
   a second nonwoven layer having a first surface and comprising melt blown nanofibers, wherein the second nonwoven layer comprises polyamide 66 and has a median pore size from 1 microns to 5.4 microns, wherein the first layer is adjacent to at least the first surface.

2. The nonwoven multilayer structure of claim 1, wherein the melt or solvent electrospun nanofibers have an average fiber diameter that is less than or equal to 300 nanometers.

3. The nonwoven multilayer structure of claim 1, wherein the melt blown nanofibers have an average fiber diameter that is from 250 to 950 nanometers.

4. The nonwoven multilayer structure of claim 1, wherein the basis weight of the first nonwoven layer is less than second nonwoven layer.

5. The nonwoven multilayer structure of claim 1, wherein the basis weight of the first nonwoven layer is less than or equal to 25 gsm.

6. The nonwoven multilayer structure of claim 1, wherein the basis weight of the second nonwoven layer is from 0.9 to 50 gsm.

7. The nonwoven multilayer structure of claim 1, wherein less than 20% of the electrospun nanofibers have a diameter of greater than 100 nanometers.

8. The nonwoven multilayer structure of claim 1, wherein no more than 20% of the melt blown nanofibers have a diameter of greater than 700 nanometers.

9. The nonwoven multilayer structure of claim 1, wherein first nonwoven layer comprises a first polymer and the second nonwoven layer comprises a second polymer.

10. The nonwoven multilayer structure of claim 9, wherein the second polymer has relative viscosity (RV) from 2 to 330.

11. The nonwoven multilayer structure of claim 1, wherein the ratio of the median pore size ratio of the first nonwoven layer to the second nonwoven layer is from 1:1 to 1:100.

12. The nonwoven multilayer structure of claim 1, wherein the second nonwoven layer comprises a second surface, and wherein a scrim layer is adjacent to the second layer.

13. The nonwoven multilayer structure of claim 1, wherein the second nonwoven layer has an oxidation degradation index (ODI) of less than 200.

14. The nonwoven multilayer structure of claim 1, wherein the second nonwoven layer has a thermal degradation index (TDI) of less than 4000.

15. A nonwoven multilayer structure comprising:
(a) a first nonwoven layer having first nanofibers having the following first properties (a1) to (a4):
   (a1) an average fiber diameter from 1 to 300 nm;
   (a2) a basis weight from 0.0001 to 25 gsm;
   (a3) a median pore size from 0.01 to 0.414 microns; and
   (a4) an average thickness of less than or equal to 30 microns; and
(b) a second nonwoven layer having second nanofibers having the following second properties (b1) to (b7):
   (b1) an average fiber diameter from 250 to 950 nm;
   (b2) a basis weight from 0.9 to 50 gsm;
   (b3) a median pore size from 1 microns to 5.4 microns;
   (b4) an average thickness from 5 to 500 microns;
   (b5) less than 1 wt. % solvent;
   (b6) thermal degradation index of less than 4000; and
   (b7) oxidative degradation index of less than 200;
wherein the first property is different from the second property.

16. The nonwoven multilayer structure of claim 15, wherein the first nonwoven layer comprises a first polymer and the second nonwoven layer comprises a second polymer,
   wherein the first polymer comprises polyimide, polyolefin, polyamide, polyester, polystyrene, polyacrylonitrile, polyurethane, polylactic acid, polycaprolactone, polysulfone, fluoropolymer, polyacrylonitrile, polymethyl methacrylate, polystyrene, poly(vinyl chloride), poly(vinyl alcohol), poly(vinyl butylene), poly(vinylidene fluoride), polybutylene terephthalate, cellulose, and copolymers or derivative compounds thereof, and combinations thereof; and
   wherein the second polymer polyamide, polyolefin, polyester, polystyrene, polyacrylonitrile, polyurethane, polyimide, polylactic acid, polycaprolactone, polysulfone, fluoropolymer, polyacrylonitrile, polymethyl methacrylate, polystyrene, poly(vinyl chloride), poly(vinyl alcohol), poly(vinyl butylene), poly(vinylidene fluoride), polybutylene terephthalate, cellulose, and copolymers or derivative compounds thereof, and combinations thereof.

* * * * *